United States Patent [19]

Ichikawa

[11] 4,406,577
[45] Sep. 27, 1983

[54] MULTI-STAGE HYDRAULIC MACHINE AND A METHOD OF OPERATING SAME

[75] Inventor: Kentaro Ichikawa, Chigasaki, Japan

[73] Assignee: Tokyo Shibaura Denki Kabushiki Kaisha, Kawasaki, Japan

[21] Appl. No.: 199,628

[22] Filed: Oct. 22, 1980

[30] Foreign Application Priority Data

Oct. 29, 1979 [JP] Japan .................................. 54/139518
May 30, 1980 [JP] Japan .................................. 55-72470

[51] Int. Cl.³ .......................... F04D 9/00; F03B 3/10
[52] U.S. Cl. ........................................ 415/1; 415/500; 415/116
[58] Field of Search ........................... 415/1, 500, 116

[56] References Cited
U.S. PATENT DOCUMENTS 3,507,603 4/1970 Von Widdern .

Primary Examiner—Harvey C. Hornsby
Assistant Examiner—Brian J. Bowman
Attorney, Agent, or Firm—Oblon, Fisher, Spivak, McClelland & Maier

[57] ABSTRACT

A multi-stage hydraulic machine which includes a plurality of runner housings or chambers each having a runner positioned therein, a head cover and an intermediate speed ring, movable guide vanes at an outside portion of the runner housing or chamber of the highest pressure stage, each of the runners having a runner crown with an exhaust hole bored through it, each of the runner housings or chambers having an exhaust chamber formed at the exit portion of the exhaust hole and a device for sealing water at the radially outside portion of the exhaust chamber, and a plurality of exhaust paths provided in each of the exhaust chambers to the exterior of the machine respectively. Additionally, a method for operating the machine is disclosed.

4 Claims, 8 Drawing Figures

MULTI-STAGE HYDRAULIC MACHINE AND A METHOD OF OPERATING SAME

BACKGROUND OF THE INVENTION

1. Field of the Invention:

This invention relates to a multi-stage hydraulic machine. This invention also relates to a method for operating a multi-stage hydraulic machine.

2. Description of the Prior Art:

Recently pumping type power plants have been constructed at places where a high head can be obtained, so demand for multi-stage hydraulic machines, for example, multi-stage pump turbines, is increasing. Movable guide vanes are not provided in a conventional multi-stage pump turbine, so in order to operate it as a pump it must be started in water. However a multi-stage pump turbine with a large capacity needs a very high input power to start the multi-stage pump turbine as a pump in water. As a result of this, this starting method adversely effects the electric power system to which it is connected, and particularly adversely effects such system for an economical point of view. Moreover in the recently developed large capacity multi-stage hydraulic machines, condenser operation for rotating the runner in air and spinning reserve operation while the runner is rotating in air are required. In order to fill these requirements it is essential to start a multi-stage hydraulic machine in air as a pump under the condition where the water level is lowered such an amount that the runner is out of contact with the water.

However in a conventional multi-stage hydraulic machine, the structure of water flow path is so complicated that it was difficult to exhaust compressed air in each runner housing or chamber completely without exhaustion retardation. It was therefore difficult to start a multi-stage hydraulic machine in air as a pump, and accordingly condenser operation or spinning reserve operation were difficult.

SUMMARY OF THE INVENTION

Accordingly, one object of this invention is to provide a novel multi-stage hydraulic machine which can exhaust the compressed air in the runner housing or chamber completely without exhaustion retardation.

Another object of this invention is to provide a multi-stage hydraulic machine which can be started as a pump in air under the condition where the water level is lowered such an amount that the runner is out of contact with the water.

Still another object of this invention is to provide a multi-stage hydraulic machine which can be operated as a condenser.

A still further object of this invention is to provide a multi-stage hydraulic machine which can be operated with spinning reserve operation.

Another object of this invention is to provide a novel method for operating a multi-stage hydraulic machine with which the compressed air in the runner housings or chambers can be exhausted completely without exhaustion retardation.

Still another object of this invention is to provide a method for operating a multi-stage hydraulic machine with which the machine can be started as a pump in air under the condition where the water level is lowered such an amount that the runner is out of contact with the water.

Another object of this invention is to provide a method for operating a multi-stage hydraulic machine with which the machine can be operated as a condenser.

Still another object of this invention is to provide a method for operating a multi-stage hydraulic machine wherein the machine can be operated with spinning reserve operation.

These and other objects of this invention are achieved by a multi-stage hydraulic machine including a plurality of runner housings or chambers, each of the runner housings or chambers being connected to the runner housing or chamber of the next stage thereof through a return path and having a runner supported on a main shaft of the machine, respectively, a head cover above the runner of the highest pressure stage, an intermediate speed ring provided between the runner housing or chamber and the runner housing or chamber of the next stage thereof, movable guide vanes provided at the outside of the runner housing or chamber of the highest pressure stage, each of the runners having a runner crown with an exhaust hole bored through from the water flow side of the runner to the back side thereof, each of the runner housings or chambers having an exhaust chamber at the exit of the exhaust hole and a mechanism for sealing water at the radial outside portion of the exhaust chamber, and a device for exhausting the air in each of the exhaust chambers to the exterior of the machine, respectively.

These and other objects of this invention are also achieved by a method for operating a multi-stage hydraulic machine as described above, and including the steps of closing the guide vanes totally, feeding air into each of the runner housings or chambers until the water level is lowered by such an amount that the runner of the lowest pressure stage is out of contact with the water, starting rotation of the runners in air, exhausting the air in the runner housing or chamber of the highest pressure stage to introduce water into the runner housing or chamber of the highest pressure stage through the return path from a draft tube, detecting the volume of the air remaining in the runner housing or chamber of highest pressure stage, and exhausting the air in each of the runner housings or chambers when the detected volume of the remaining air reaches to a predetermined value.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
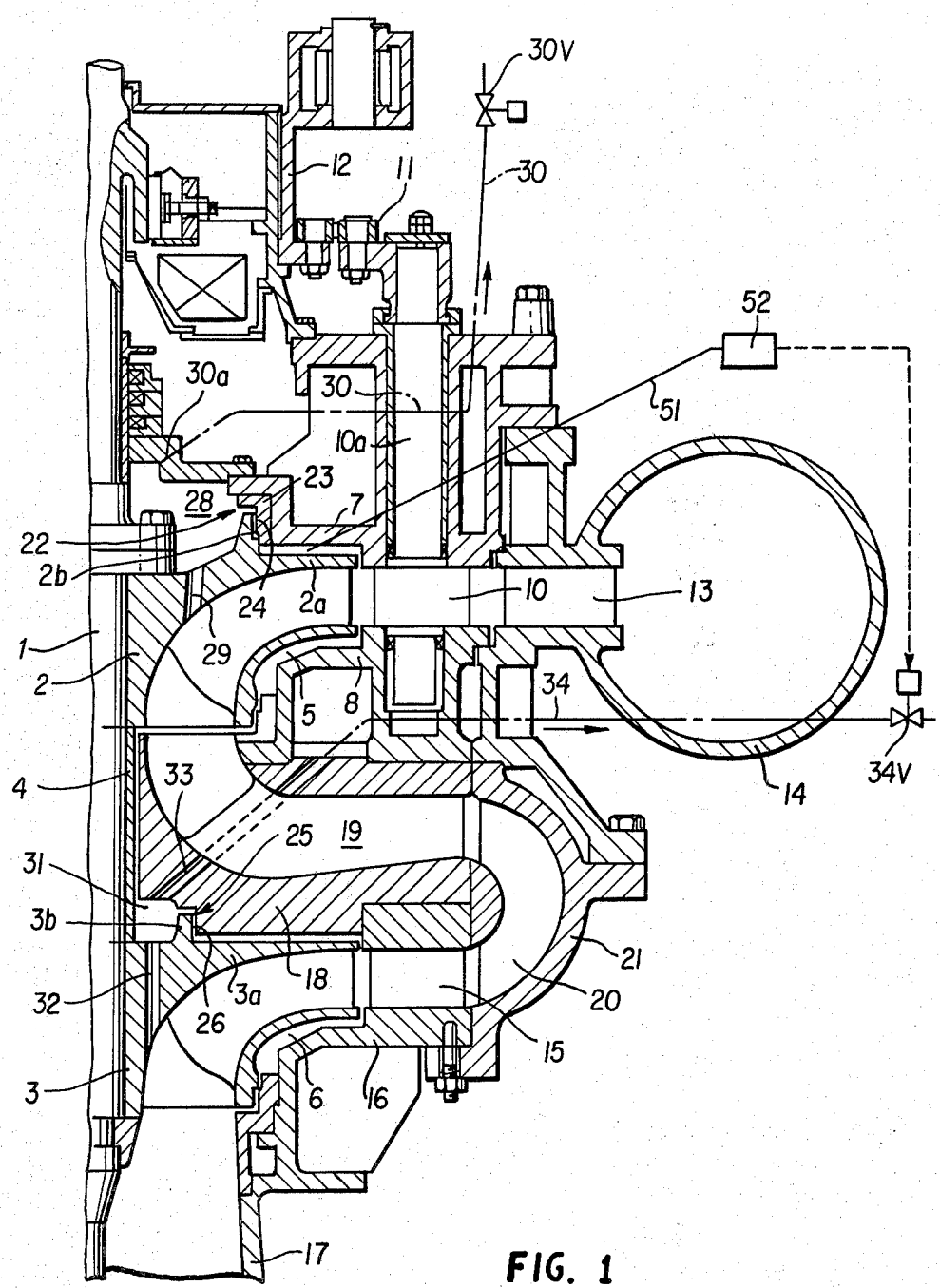
FIG. 1 is a schematic vertical cross-sectional view of a two-stage pump turbine according to a preferred embodiment of this invention.

Referring now to the drawings wherein like reference numerals designate identical or corresponding parts throughout the several views, and more particularly to FIG. 1 thereof, wherein a two-stage pump turbine according to a preferred embodiment of this invention is shown, numeral 1 designates a main shaft of the two-stage pump turbine. A runner 2 of a high pressure stage and a runner 3 of a low pressure stage are supported to the main shaft 1 with a certain distance therebetween being filled by a spacer 4. The runner 2 is provided in a runner housing or chamber 5 of a high pressure stage and the runner 3, a runner housing or chamber 6 of a low pressure stage.

There is also provided a head cover 7 above the runner 2 and the bottom cover 8 below the runner 2. There are further provided movable guide vanes 10 which can adjust the opening of the inlet port at the radial outside portion of the runner 2 between the head cover 7 and the bottom cover 8. A link motion member 11 for operating guide vanes 10 is connected at the top terminals of upper stems 10a of the guide vanes 10. The guide vanes 10 are opened or closed by a guide ring 12 of the link motion member 11 which is apparent to those skilled in the art. There is also provided a spiral casing 14 with stay vanes 13 as one body at the radial outside portion of the guide vanes 10. A bottom cover 16 with stay vanes 15 as one body is disposed beneath the runner 3 and the lower terminal of the bottom cover 16 is connected to a draft tube 17. An intermediate speed ring 18 is positioned between the bottom cover 8 and the bottom cover 16, which also acts as a head cover of the runner 3. The intermediate speed ring 18 has a plurality of return vanes 19 and the path between the return vanes 19 forms a return path.

There is also provided an outer housing 21 located outside and between the intermediate speed ring 18 and the bottom cover 16, which has a return path 20 inside thereof.

A device 22 for sealing water between a runner crown 2a of the runner 2 and the head cover 7, is utilized which includes a labyrinth passage 24 between a cover liner 23 of the head cover 7 and a seal ring 2b of the runner crown 2a. Similarly a device 25 for sealing water is positioned between a runner crown 3a of the runner 3 and the intermediate speed ring 18, which includes a labyrinth passage 26 formed between the intermediate speed ring 18 and a seal ring 3b of the runner crown 3a.

An exhaust chamber 28 of the high pressure stage is formed in the radially interior portion of the sealing device 22 of the runner 2. An exhaust hole 29 is bored through the runner crown 2a of the runner 2 which forms a path from the under portion of the runner crown 2a to the exhaust chamber 28. The top portion of the exhaust chamber 28 is connected to a terminal portion 30a of an exhaust tube 30 through which the air inside the exhaust chamber 28 can be exhausted outside. Similarly there is provided an exhaust chamber 31 of the low pressure stage in the radially interior portion of the sealing device 25 of the runner 3. An exhaust hole 32 is bored through the runner crown 3a of the runner 3 which forms a path from the under portion of the runner crown 3a to the exhaust chamber 31. The top portion of the exhaust chamber 31 is connected to an exhaust path 33, which is provided by being bored in the intermediate speed ring 18 and the return vane 19 thereof. The exhaust path 33 is connected to an exhaust tube 34 through which the air inside the exhaust chamber 31 can be exhausted outside.

An exhaust valve 30V, 34V is positioned in exhaust tubes 30, 34 respectively. Furthermore, a terminal portion of the detection tube 51 is connected to a predetermined position of the head cover 7 of the runner housing or chamber 5 of the high pressure stage to detect the inside position of the water flowing from the outside to the inside of the back pressure housing or chamber of the runner 2. The base terminal portion of the detection tube 51 is connected to a detection relay 52, the output signal of which is connected to the exhaust valve 34V. In operating the two-stage pump turbine described above as a turbine, water flows into the spiral casing 14 from the penstock (not shown). This water flows between the guide vanes 10, in the runner 2, in the return path 20, in the runner 3 and finally flows into the draft tube 17.

Figure 2:
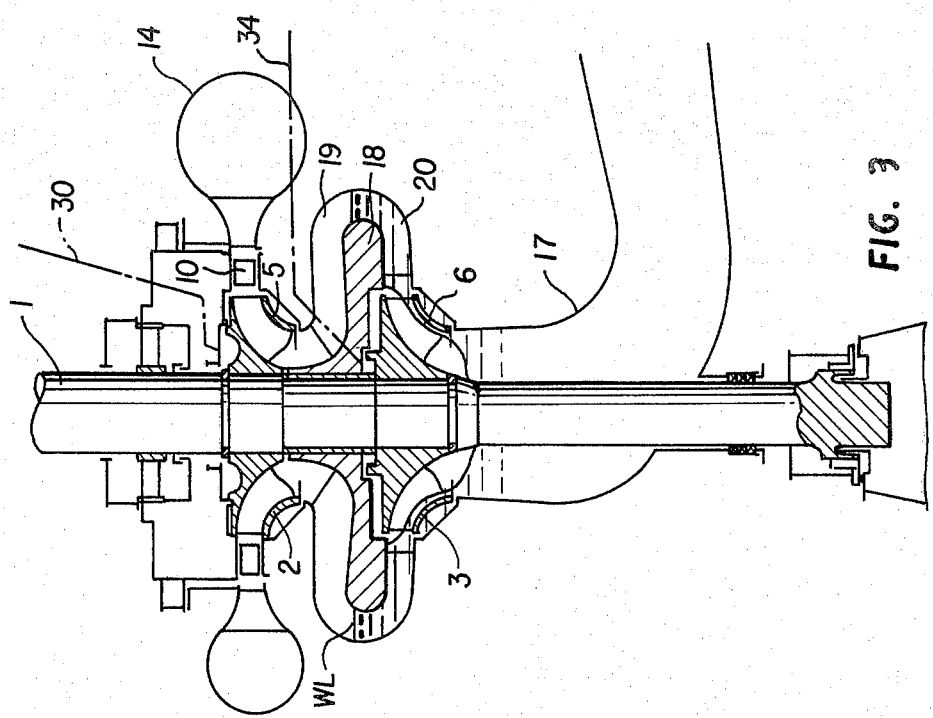
FIGS. 2, 3 and 4 are schematic vertical cross-sectional views that show the process of the starting operation of the two-stage pump turbine shown in FIG. 1 as a pump in air.
Figure 3:
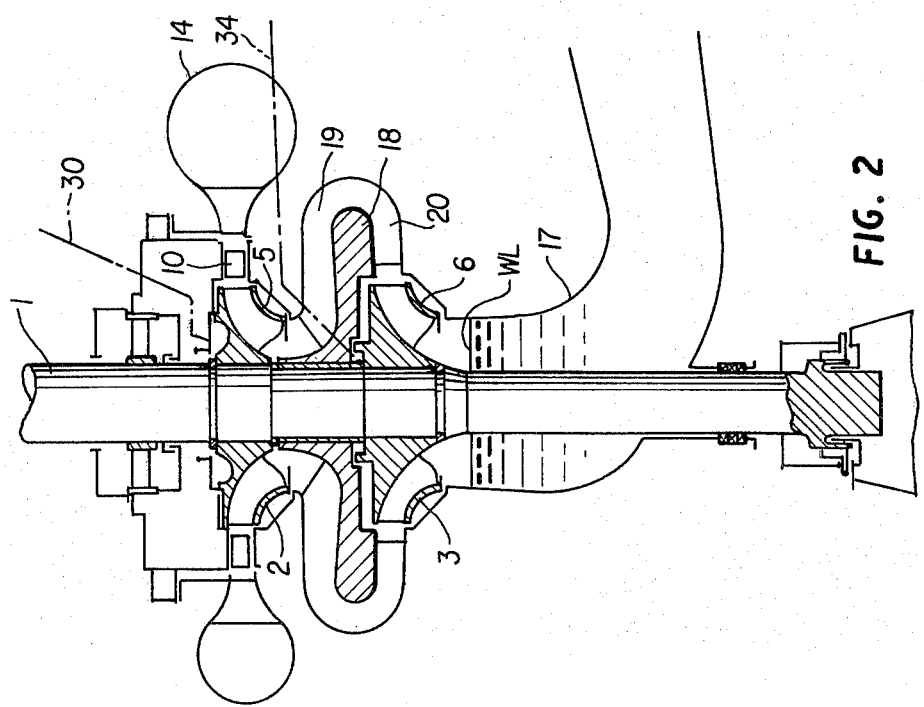

On the contrary, in operating the two-stage pump turbine as a pump, water flows from the draft tube 17 to the penstock along the opposite route of turbine operation. Hereinafter starting operation of the two-stage pump turbine described above as a pump will be explained in detail. In FIG. 2, compressed air is blown into the runner housing or chamber 5 of the high pressure stage through a compressed air feeding tube (not shown) in the state that the guide vanes 10 are totally closed. As a result of this, the water in and under the runner housing or chamber 5 is depressed below the runner housing or chamber 6 through the return vanes 19 and the return path 20. Eventually, the water level WL reaches the position shown in FIG. 2 in the draft tube 17 which is below the runner housing or chamber 6. Then the runner 2 and the runner 3, having decreased rotational resistance, are started in air as a pump with a small capacity starter. After being started, the two-stage pump turbine is connected with electric power system and at the same time exhaustion is begun using the exhaust tube 30. An exhaustion proceeds, the water level WL in the draft tube 17 is raised and reaches the runner 3. The water which reaches the runner 3 is splattered in a radially outward direction by the centrifugal force of the rotating runner 3 and fills the return path 20 shown in FIG. 3. During this procedure air remains in the center portion of the runner 3 as the specific weight of air is much smaller than that of water, and the outer surface of the air remaining is choked by a wall of water. As exhaustion proceeds further, the water level WL goes up and reaches the runner 2 and the water is also splattered in a radially outward direction by the centrifugal force of the rotating runner 2. However as the guide vanes 10 are totally closed, the water in the runner housing or chamber follows along the inside wall thereof. Then the surface of the water wall proceeds radially inside gradually and reaches to the state shown in FIG. 4.

When the volume of the air in the runner housing or chamber 5 becomes nearly equal to the volume of the air remaining in the runner housing or chamber 6, the exhaust tube 34 of the low pressure stage is opened to start exhausting air from the runner housing or chamber 6. Exhaustion is continued while keeping a balance between the amount of water filled in the runner housing or chamber 5 and that in the runner housing or chamber 6. When exhaustion is completed, the guide vane 10 is opened and pumping operation of the two-stage pump turbine is started. Additionally, the method for controlling exhaustion will be described later in detail.

In a conventional multi-stage hydraulic machine it was difficult to exhaust the air remaining without exhaustion retardation. In this embodiment of the present invention, however, there are provided the exhaust chambers 28, 31 at the exit of the exhaust holes 29, 32 bored through the runner crowns 2a, 3a of the runners 2, 3 respectively. There is also provided devices 22, 25 for sealing water including the labyrinth passages 24, 26 at the outside of the exhaust chambers 28, 31 and at the back side of the runner crowns 2a, 3a respectively. Therefore, it is easy to exhaust the air in the runner housings or chambers 5,6 to the outside without entailing exhaustion retardation which heretofore frequently occured in the exhaust process of a conventional multi-stage hydraulic machine.

Figure 5:
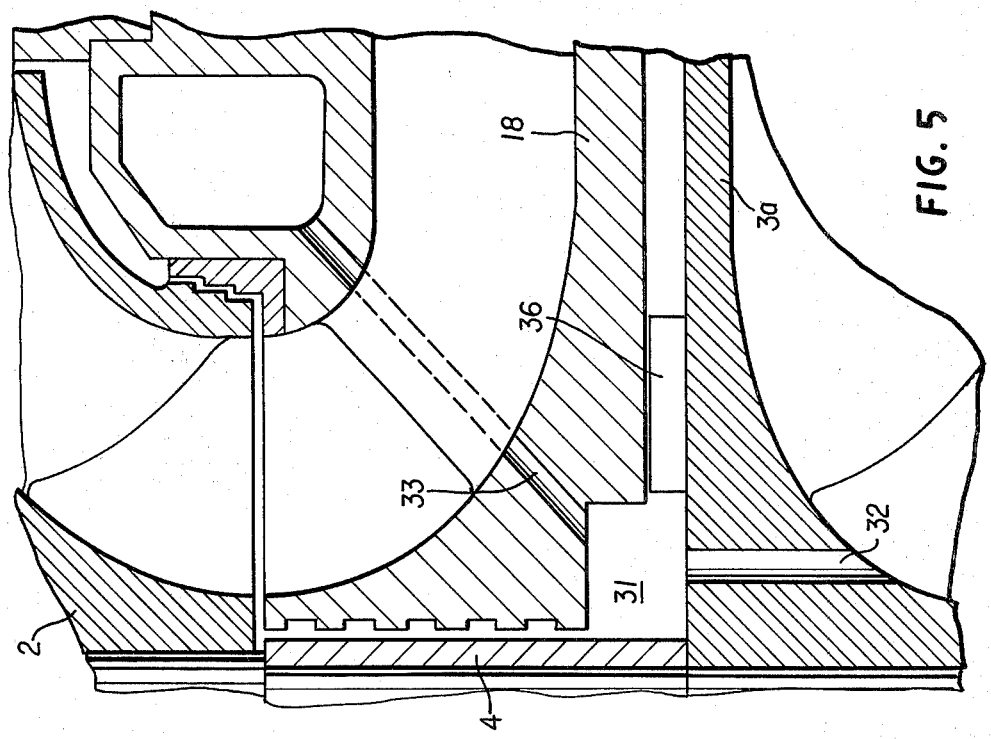

In the embodiment described above, the labyrinth passages 24,26 in the devices for sealing water is positioned between the runner crowns 2a,3a and the head cover 7, and the intermediate speed ring 18 respectively. However this invention is not restricted to this embodiment. For example, a plurality of fins 36 at the back side of the runner crown 3a and radially outside portion of the exhaust chamber 31 can be provided radially as a device for sealing water as shown in FIG. 5. In the embodiment shown in FIG. 5, the water is obstructed from flowing radial inside of the gap between the runner crown 3a and the intermediate speed ring 18 by the head caused by the centrifugal force of the fins, which allow for a desirable effect in sealing water.

Figure 6:
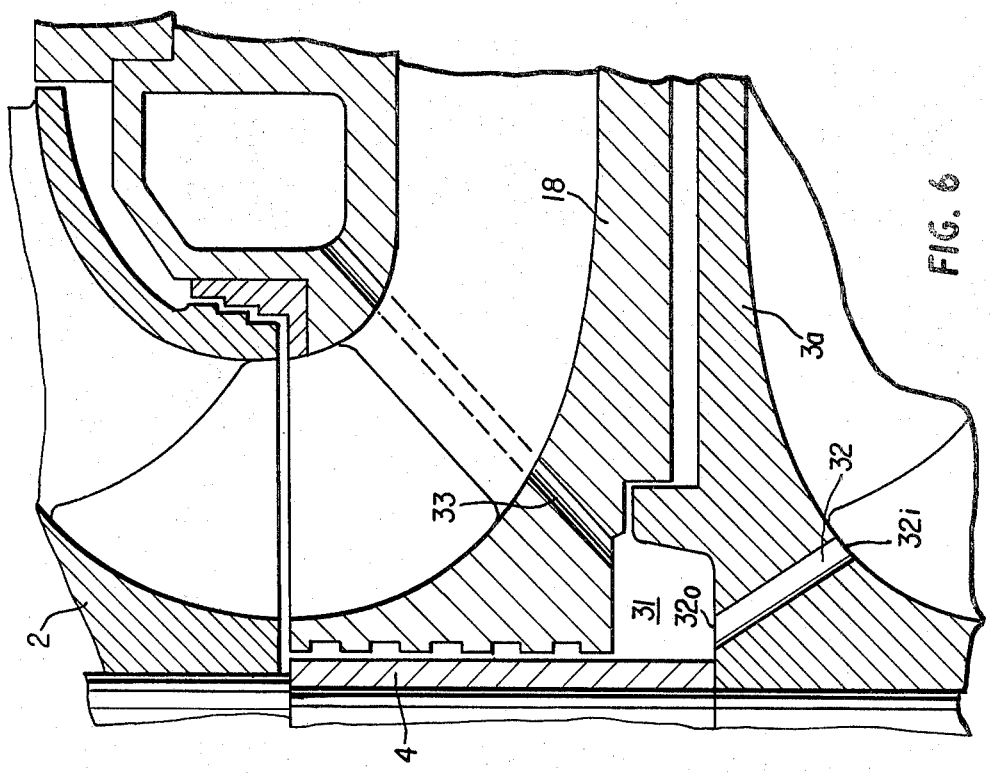
FIGS. 5, 6, 7 and 8 are schematic vertical cross-sectional views of the device for sealing water in the two-stage pump turbine according to another preferred embodiment of this invention respectively.

In the embodiment shown in FIG. 1, the exhaust holes 29, 32 are bored through the runner crowns 2a, 3a approximately parallel with the axis line of the main shaft 1. But in another embodiment of this invention, for example, in the runner 3 of low pressure stage shown in FIG. 6, the position of exit $32_o$ of the exhaust hole 32 can be nearer to the main shaft 1 than that of entrance $32_i$ thereof. That is, the center line of the exhaust hole 32 can be situated so as to form a certain angle with respect to the main shaft 1.

Figure 7:
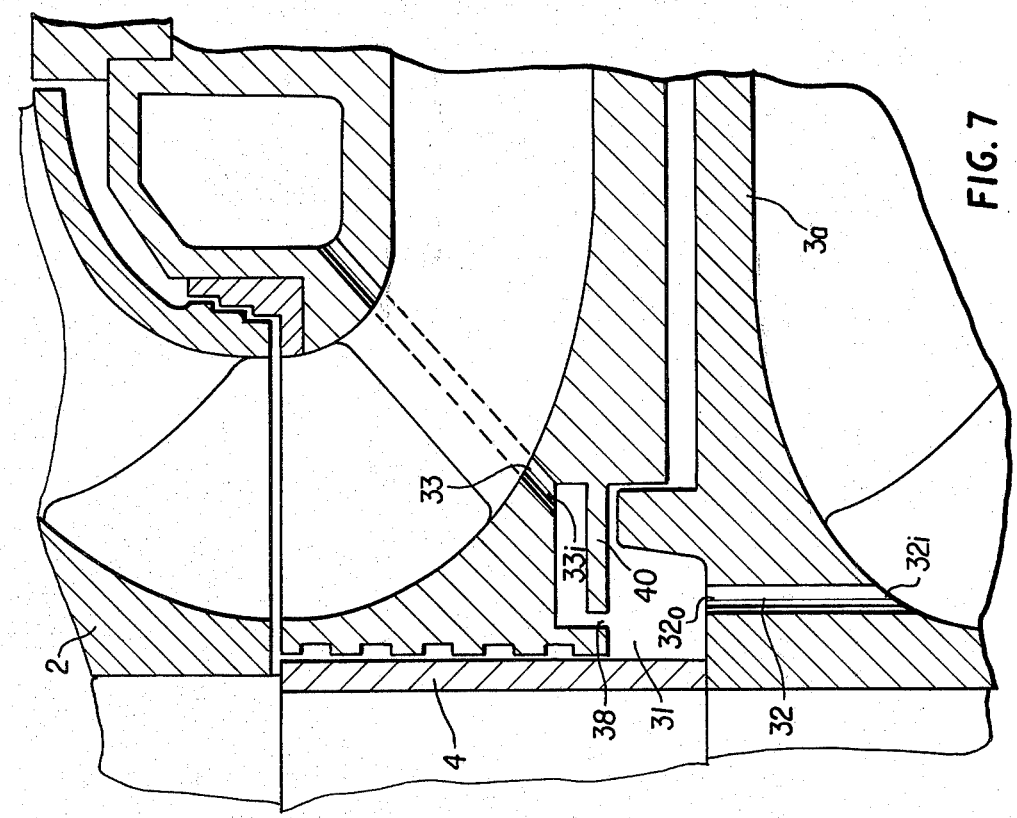

As the exhaust hole 32 is constructed in this manner a head from the exhaust chamber 31 to the water flow side arises according to the difference between the velocity heads of water corresponding to the difference between radial position of the entrance $32_i$ and the exit $32_o$. This makes the water flow into the exhaust chamber 31 through the device for sealing water, which is not sealed completely, and to discharge to the water flow side through the exhaust hole 32. Therefore this prevents the water from blocking the entrance portion of the exhaust tube 33. When the runner 3 is filled with water until the entrance $32_i$ of the exhaust hole 32 is filled, the water is prevented from entering into the exhaust chamber 31 through the exhaust hole 32. As described above, in this embodiment of this invention, the air remaining in the runner housing or chamber can be exhausted more completely. In FIG. 7 wherein still another embodiment of this invention is shown, a disc type partition board 40 is disposed in the exhaust chamber 31, between the entrance $32_i$ of the exhaust path 33 and the exit $32_o$ of the exhaust hole 32. The outer circumference of the disc type partition board 40 is fixed to the intermediate speed ring 18 as one body. A cylindrical gap 38 is formed between the inner circumference of the board 40 and the inner circumference of the intermediate speed ring 18. In this embodiment, when water flows into the exhaust chamber 31, the water follows along the outer circumference of the exhaust chamber 31. Therefore the water and the air in the exhaust chamber 31 are in separate states according to the difference between the specific weight of air and water and the centrifugal force on the water in the exhaust chamber 31. Thus, only air in the exhaust chamber 31 can pass through the cylindrical gap 38 adjacent the main shaft 1, which means that the air is exhausted more completely.

Figure 8:
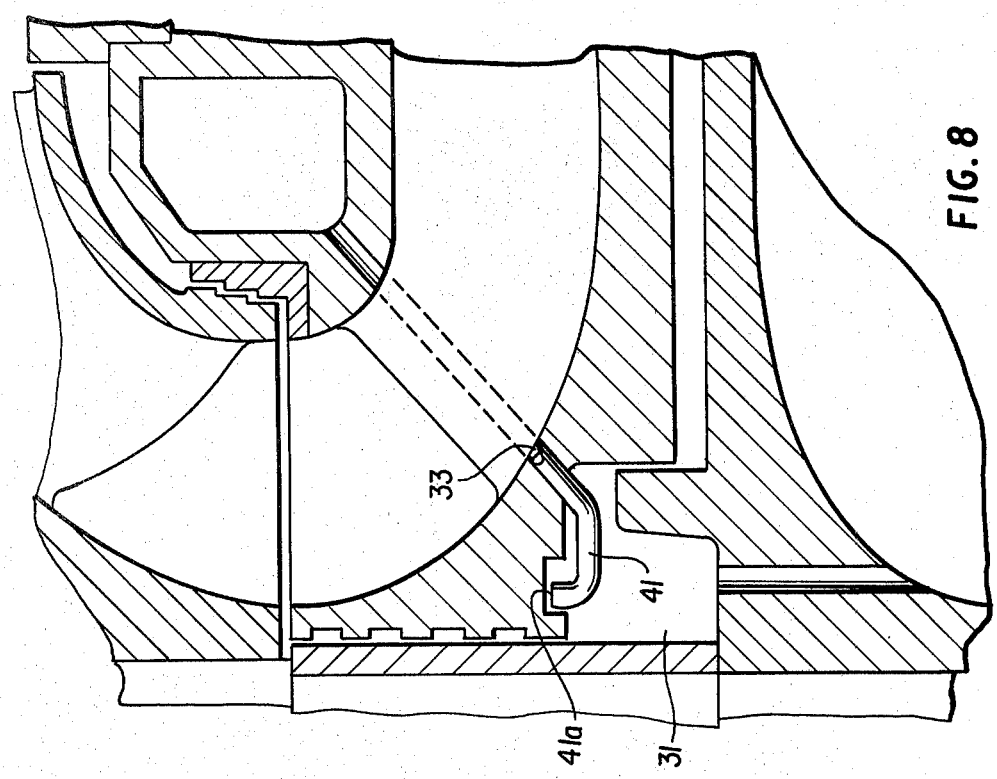

In FIG. 8, wherein a still further embodiment of this invention is shown, the end portion 41 of the exhaust path 33 in the exhaust chamber 31 is an L-type pipe and the opening terminal 41a of the portion 41 is provided at the highest and most inner part of the exhaust chamber 31. In the exhaust chamber 31, the water is separated to the outer circumferential part thereof and the air is separated to the higher and inner circumferential part thereof such that the air is exhausted more completely.

In the embodiments described above, this invention is applied to a two-stage pump turbine which has movable guide vanes in a high pressure stage, but this invention can be applied to a two-stage pump turbine which has movable guide vanes in both the high and low pressure stage. This invention can also be applied to a three or more stage hydraulic machine.

Next a method for operating a multi-stage hydraulic machine according to this invention will be described in detail.

Figure 4:
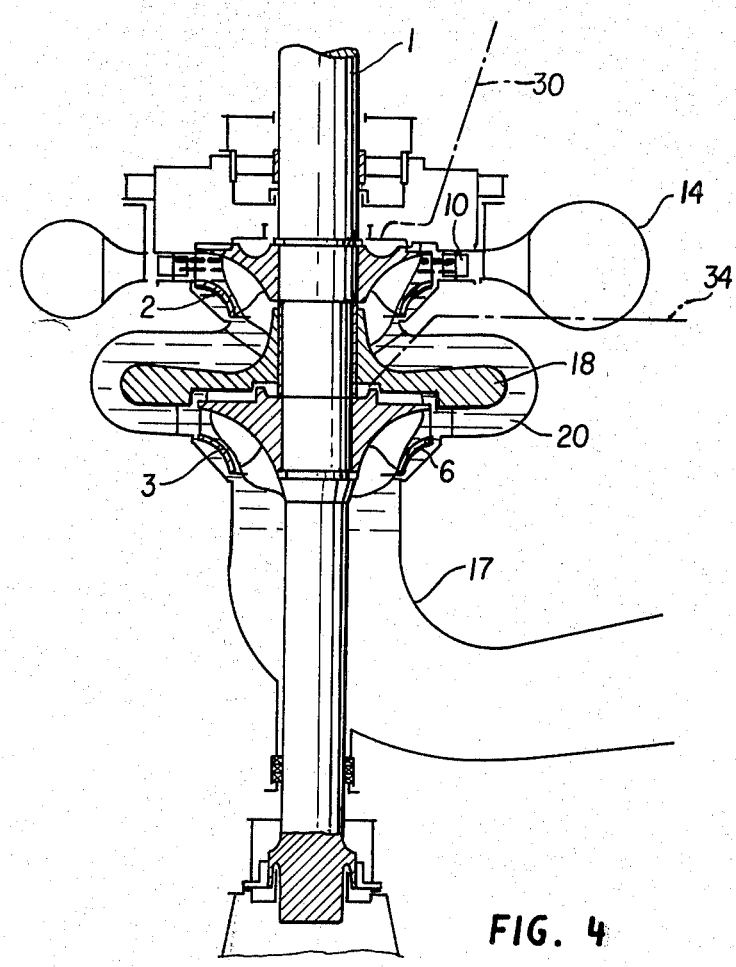

Here it is assumed that the two-stage pump turbine shown in FIG. 1 reaches the state shown in FIG. 4, as described above. As the exhaustion of the air in the runner housing or chamber 5 of higher pressure stage proceeds, the volume VH of the air remaining in the runner housing or chamber 5 decreases gradually and becomes equal to the volume VL of the air remaining in the runner housing or chamber 6 of the low pressure stage. This state is detected by the detection tube 51 which is provided at a predetermined position corresponding to the radial position where the volume VH is equal to the volume VL. This position is previously determined by calculations or experimentations which are apparent to those skilled in the art. When the volume VH becomes equal to the volume VL, the detection relay 52 detects this state through the detection tube 51 and generates an output signal to make the exhaust valve 34V open. Then the air remaining in the runner housing or chamber 6 of the low pressure stage is exhausted through the exhaust path 33 and the exhaust tube 34. Here it is assumed that each exhaust path from the exhaust chamber of each pressure stage to outside atmosphere is approximately in the form of a fanning out nozzle and that the air passing through the nozzle is an approximately ideal gas that expands adiabatically. Total pressure Po of the air remaining in the runner housing or chamber can be regarded as being static pressure Pso since the velocity of the air in the runner housing or chamber is much smaller than the velocity of the air flowing in the nozzle. Therefore critical pressure Pc can be determined by equation (1).

$$Pc = Po \left[ \frac{2}{K+1} \right]^{\frac{K}{K-1}} \quad (1)$$

-continued
$$\approx P_{so} \left[ \frac{2}{K+1} \right]^{\frac{K}{K-1}}$$

Here K is relative specific heat ( in the case of air $K \approx 1.40$)

As the terminal of the exhaust path is opened to the atmosphere, the back pressure of the nozzle P2 becomes $P_2 = 1$ (Kg/cm$^2$).

When the value of Pso is required using equation (1) wherein $Pc = P_2$, Pso is determined as follows $$P_{so} = 1.89 \text{ (Kg/cm}^2) = 18.9 \text{ (m water column)}.$$

Generally in the case of multi-stage pump turbine, a forced head is provided of at least 20 m, and the critical pressure Pc at each pressure stage is such that $$Pc > P_2$$

Therefore flow rate GS (Kg/s) of the air flowing out of the nozzle is limited by the flow rate of the air flowing at the position where the cross sectional area thereof is minimal (throat position). The flow rate GS at this point is determined by equation (2)

$$GS = Ac \sqrt{g \cdot K \left[ \frac{2}{K+1} \right]^{\frac{K+1}{K-1}} \cdot P_{so} \cdot r} \quad (2)$$

wherein Ac is the area of the throat position, r is the specific gravity of air and g is acceleration due to gravity. Therefore the exhaust time t is determined by equation (3)

$$t = \frac{V \cdot r}{Gs} = \frac{V}{Ac} \frac{1}{\sqrt{g \cdot K \left[ \frac{2}{K+1} \right]^{\frac{K+1}{K-1}} \cdot \frac{P_{so}}{r}}} \quad (3)$$

$$= C \cdot V \frac{1}{\sqrt{P_{so} \cdot v}}$$

wherein V is the volume of the staying air, v is the specific volume ($-1/r$) and C is a constant as $$C = \frac{1}{Ac} \cdot \frac{1}{\sqrt{g \cdot K \left[ \frac{2}{K+1} \right]^{\frac{K+1}{K-1}}}}$$

In the case of an ideal gas, $$P_{so} \, v = R \cdot T_o = \text{constant}$$

Thus the exhaustion time t at each pressure stage is understood to be proportional to the volume V of the staying air.

Therefore the exhaust valve 34V is opened when the volume VH of the air remaining in the runner housing or chamber 5 of the high pressure stage becomes equal to the volume VL of the air remaining in the runner housing or chamber 6 of the low pressure stage, both exhaustions being completed at the same time for the reasons described above.

In the embodiment shown in FIG. 1, the occurrence of the volume VH becoming equal to the volume VL is detected by the detection tube 51. Namely, the detection tube 51 detects the corresponding position where the volume VH is equal to the volume VL by checking the position of the surface of the water moving inward from the outer circumference of the back pressure chamber of the runner 2 of the high pressure stage. However, instead of a detection tube, a pressure switch can be used to detect the occurrence of the volume being equal to the volume VL by checking the change of static pressure in the back pressure chamber of the runner 2 of the high pressure stage.

Moreover, when the head in the draft tube 17 changes greatly according to the change of the water level of the lower reservoir, a plurality of detection relays can be provided at different radial positions in the back pressure chamber of the runner of the high pressure stage. One of the detection relays is selected to be used according to the static pressure of the water in the draft tube 17.

Obviously numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for operating a multi-stage hydraulic machine including;
    a plurality of runners;
    a plurality of runner housings for housing each of said plurality of runners, respectively;
    each of said runner housings being connected to a runner housing of the next stage thereof through a return path; and
    movable guide vanes positioned outside of said runner housing of a highest pressure stage, comprising the steps of:
    completely closing said guide vanes;
    feeding air into each of said runner housings until the water level is lowered by such an amount that a runner of a lowest pressure stage is out of contact with the water;
    starting rotation of said runners in air;
    exhausting the air in said runner housing of the highest pressure stage so as to introduce water into said runner housing of the highest pressure stage through said return path;
    detecting the volume of the air remaining in said runner housing of the highest pressure stage; and
    exhausting the air in each of the remaining runner housings when the detected volume of the air remaining reaches predetermined value.

2. The method for operating a multi-stage hydraulic machine of claim 1, wherein:
    said detecting step comprises detecting the position of the water moving inward from an outer circumferential portion of a back pressure chamber of said runner of the highest pressure stage.

3. The method for operating a multi-stage hydraulic machine of claim 1, wherein:
    said detecting step comprises detecting the pressure in a back pressure chamber of said runner of the highest pressure stage.

4. The method for operating a multi-stage hydraulic machine of claims 1, 2 or 3, wherein:
    said predetermined value is equal to the volume of the air remaining in said runner chamber of the remaining stages.

* * * * *